US011309953B2

(12) United States Patent
Hwang et al.

(10) Patent No.: US 11,309,953 B2
(45) Date of Patent: Apr. 19, 2022

(54) BEAMFORMING ARCHITECTURE FOR MULTI-BEAM MULTIPLE-INPUT-MULTIPLE-OUTPUT (MIMO)

(71) Applicant: Apple Inc., Cupertino, CA (US)

(72) Inventors: Yeong-Sun Hwang, Oberhaching (DE); Yuan Zhu, Beijing (CN); Elmar Wagner, Taufkirchen (DE)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/120,931

(22) Filed: Dec. 14, 2020

(65) Prior Publication Data

US 2021/0099222 A1 Apr. 1, 2021

Related U.S. Application Data (63) Continuation of application No. 16/081,470, filed as application No. PCT/CN2016/078245 on Apr. 1, 2016, now Pat. No. 10,873,385.

(51) Int. Cl.
H04B 7/08 (2006.01)
H04B 7/0456 (2017.01)
H04B 7/06 (2006.01)
H04B 7/0413 (2017.01)

(52) U.S. Cl.
CPC .......... *H04B 7/088* (2013.01); *H04B 7/0413* (2013.01); *H04B 7/0486* (2013.01); *H04B 7/0617* (2013.01); *H04B 7/086* (2013.01)

(58) Field of Classification Search
CPC .... H04B 7/088; H04B 7/0486; H04B 7/0617; H04B 7/086
See application file for complete search history.

(56) References Cited

U.S. PATENT DOCUMENTS

| 2008/0051150 | A1 | 2/2008 | Tsutsui | |
|---|---|---|---|---|
| 2009/0080546 | A1 | 3/2009 | Zhao et al. | |
| 2010/0046421 | A1* | 2/2010 | Adams | H04B 7/086 370/316 |
| 2013/0202054 | A1* | 8/2013 | Khan | H01Q 3/26 375/259 |

(Continued)

FOREIGN PATENT DOCUMENTS

| CN | 101151816 A | 3/2008 |
|---|---|---|
| CN | 101160749 A | 4/2008 |

(Continued)

OTHER PUBLICATIONS

Patent Search Report the People's Republic of China for Patent Application No. 2016800831021; dated Nov. 13, 2020; 6 pages.

(Continued)

*Primary Examiner* — Jamal Javaid
(74) *Attorney, Agent, or Firm* — Kowert, Hood, Munyon, Rankin & Goetzel, P.C.

(57) ABSTRACT

A Multiple-Input-Multiple-Output (MIMO) antenna array configuration is described in one example comprising a plurality of Radio Frequency (RF) chains, a plurality of antenna elements, and a plurality of phase shifters, wherein the antenna elements and phase shifters form a plurality of antenna arrays, and coupled to the RF chains, and the number of antenna arrays is larger than the number of RF chains.

20 Claims, 7 Drawing Sheets (56) References Cited

U.S. PATENT DOCUMENTS

| | | | |
|---|---|---|---|
| 2014/0022125 A1 | 1/2014 | Zhu et al. | |
| 2014/0073337 A1 | 3/2014 | Hong et al. | |
| 2014/0126620 A1 | 5/2014 | Maltsev et al. | |
| 2014/0355707 A1* | 12/2014 | Kim | H04B 7/086 375/267 |
| 2015/0365832 A1 | 12/2015 | Villardi et al. | |
| 2016/0072561 A1 | 3/2016 | You et al. | |

FOREIGN PATENT DOCUMENTS

| | | |
|---|---|---|
| CN | 101162930 A | 4/2008 |
| CN | 101689712 A | 3/2010 |
| CN | 101849367 A | 9/2010 |
| CN | 103718474 A | 4/2014 |
| CN | 103765674 A | 4/2014 |
| CN | 105210306 A | 12/2015 |
| CN | 1015144600 A | 12/2015 |
| WO | 2014193475 A1 | 12/2014 |

OTHER PUBLICATIONS

International Search Report based on application No. PCT/CN2016/078245 dated Dec. 29, 2016, 12 pages (Reference Purpose Only).
National Oceanic and Atmospheric Administration, "Multi-function Phased Array Radar and Cylindrical Polarized Phased Array Radar", Report to Congress, 2015, 16 pages, National Severe Storms Laboratory.

\* cited by examiner

BEAMFORMING ARCHITECTURE FOR MULTI-BEAM MULTIPLE-INPUT-MULTIPLE-OUTPUT (MIMO)

PRIORITY CLAIM INFORMATION

This application is a continuation of U.S. patent application Ser. No. 16/081,470, titled "Beamforming Architecture For Multi-Beam Multiple-Input-Multiple-Output (MIMO)", filed Aug. 31, 2018, which is a U.S. national stage filing of PCT Application No. PCT/CN2016/078245, titled "Beamforming Architecture For Multi-Beam Multiple-Input-Multiple-Output (MIMO)", filed Apr. 1, 2016. Both of the aforementioned applications are hereby incorporated by reference in their entireties as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments described herein generally relate to communications architecture for wireless communications devices, methods, and systems for receiving or transmitting multiple beamformed signals in MIMO wireless communications.

BACKGROUND

Modern wireless communications device may include a plurality of antennas to support advanced communications technologies. For example, data may be received or transmitted via a plurality of antennas to achieve higher robustness and throughput. A plurality of antennas, for example, an array of antennas, with phases of signals at each antenna shifted by an amount, for example, a phased antenna array, may be used for beamforming techniques. Beamforming techniques can improve signal quality at an intended device while reducing unintended interference to or from other directions by controlling directional pattern of antennas. An efficient architecture may be desired for controlling directions of transmit or receive beams to any desired angles, or to any desired combinations of angles, and for supporting full-rank MIMO to, for example, achieve a large number of spatially multiplexed signal layers.

BRIEF DESCRIPTION OF THE DRAWINGS

In the drawings, like reference characters generally refer to the same parts throughout the different view. The drawings are not necessarily to scale, emphasis instead generally being place upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
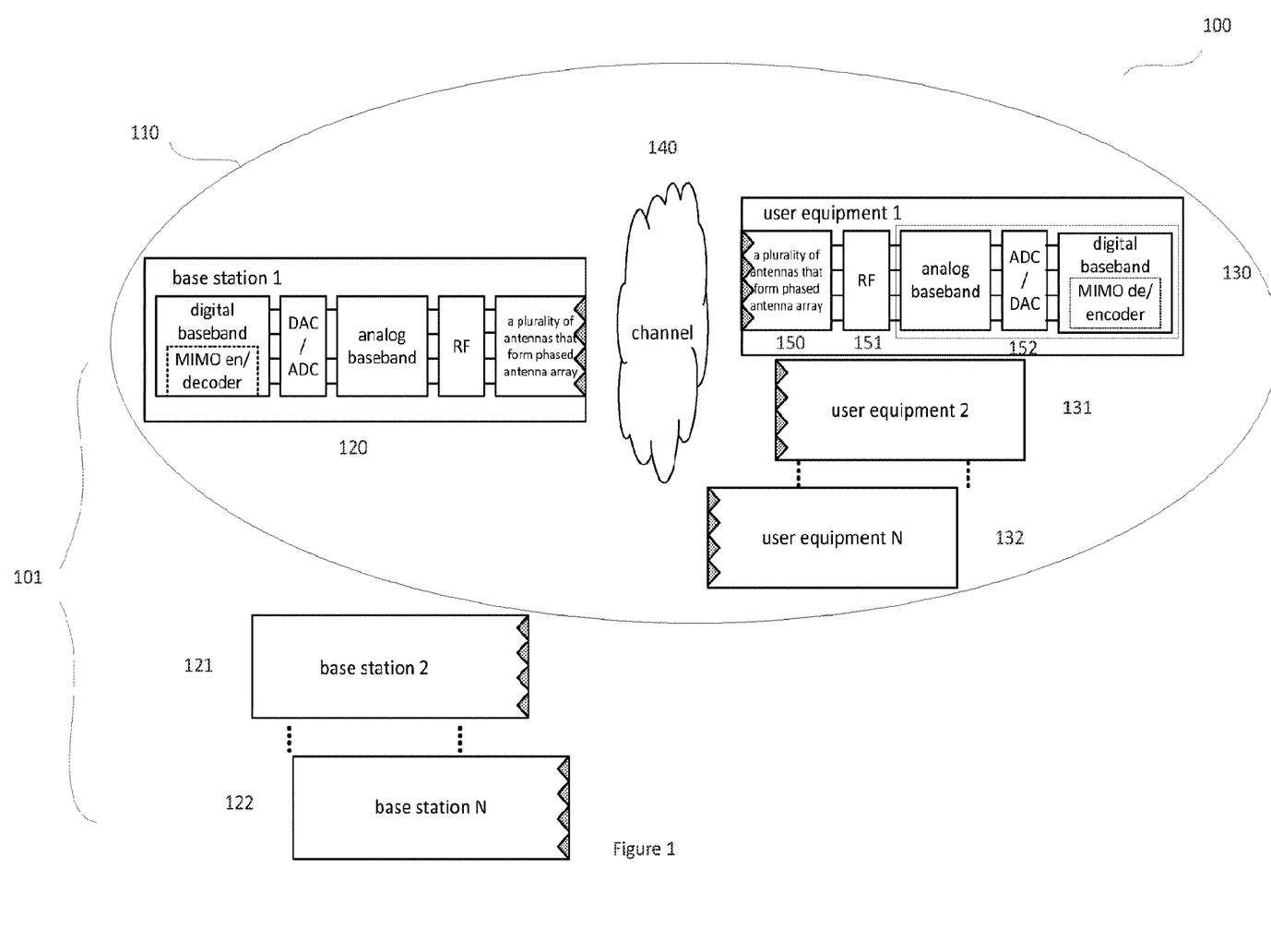
FIG. 1 shows a wireless communications system, for example, a $5^{th}$ Generation (5G) wireless communications system in accordance with some embodiments.

FIG. 1 shows a wireless communications system 100, for example, a 5G wireless communications system in accordance with some embodiments.

The wireless communications system 100, for example, a 5G wireless communications system, includes a radio access network 101. The radio access network 101 may include base stations 120-122. Each base station, for example, the base station 120, may provide radio coverage for one or more mobile radio cells, for example mobile radio cell 110, of the radio access network 101.

A plurality of wireless communications devices 130-132 (also referred to as mobile terminals, User Equipment (UEs), Mobile Stations (MS), or mobile devices) may be located in the mobile radio cell 110 of the wireless communications system 100. A wireless communications device, for example wireless communications device 130, may communicate with other wireless communications devices, for example wireless communications device 131 or 132, via a base station, for example base station 120, providing coverage for (in other words, operating) the mobile radio cell, for example mobile radio cell 110.

For radio communications via an air interface channel, for example channel 140, a wireless communications device, for example wireless communications device 130, may include a chain of Radio Frequency (RF) components 151, a plurality of antennas 150, and a baseband processor 152. A chain of RF components 151, which may also be referred to as an RF chain, may include an RF receiver, an RF transmitter, or an RF transceiver. A plurality of antennas 150 can be for example a phased antenna array. A baseband processor 152 may include, for example, an analog baseband to provide analog signal processing; an Analog-to-Digital Converter (ADC) and Digital-to-Analog Converter (DAC) to provide conversions between the analog and digital domains; and a digital baseband to provide digital signal processing.

The wireless communications device, for example wireless communications device 130, may be within coverage of one or more mobile communications networks that may operate according to a same RAT (Radio Access Technology) or according to different RATs.

The radio access network 101 may support communications according to various communications technologies, e.g. mobile communications standards. Each base station, for example 120, may provide a radio communication connection via air interface channel, for example air interface channel 140, between the base station 120 and a wireless communications device, for example wireless communications device 130, according to 5G, LTE (Long Term Evolution), UMTS (Universal Mobile Communications System), GSM (Global System for Mobile Communications), EDGE (Enhanced Data Rates for GSM Evolution) radio access.

A MIMO wireless communications system may be supported via multiplexing a plurality of spatially separable signal layers. Spatial separation of signal layers may be achieved with a plurality of beams by mapping one or more but not all MIMO layers to, for example, one transmit (Tx) beam at a transmitter. This type of spatial multiplexing scheme, herein denoted as multi-beam MIMO, may be an integral part of a wide range of communications systems including 5G. For example, a receiver may employ a plurality of receive (Rx) beams, with directions of the one or more Rx beams being selected according to a criterion to increase, for example, maximize, received signal quality of one signal from one Tx beam. Bilateral beamforming, in both transmit and receive directions, may be especially useful in high frequency bands, for example, millimeter wave bands (30-300 GHz), due to high atmospheric attenuation and material absorption characteristics of radio waves in the high frequency bands.

A bilateral L-beam (L≥2, with L being an integer) MIMO supporting at least P·L layers may be achieved by L beams and a at least P·L RF chains at a transmitter or a receiver. P∈{1,2}, and denotes a number of polarizations that such a bilateral L-beam MIMO supports. For example, if P=1, MIMO supports single-polarized transmission, and if P=2 MIMO supports cross-polarized transmission. An RF chain herein denotes a logical single-layer RF chain entity. An RF chain may include, for example, an RF receiver, an RF transmitter, or an RF transceiver. An RF chain may be, for example, a physical RF block that can process multiple parallel layers, for example, both polarization components of a cross-polarized signal. A number of RF chains is kept to a low number to resolve P·L spatially-multiplexed layers for a L-beam MIMO, for example, P·L RF chains, due to cost, hardware size, and power consumption of an RF chain.

Moreover, a directional antenna, including a phased antenna array, has limited Field Of View (FOV). An FOV is an angular span to which a main lobe of an antenna array may be directed. One application of beamforming at wireless communications devices is, for example, to support MIMO communications where signals are spatially multiplexed using multiple simultaneously beamformed signals. For transmitting or receiving beamformed signals, a beamforming transmitter or beamforming receiver may couple to a directional antenna or a phased antenna array. Limited FOV of a directional antenna, for example, a phased antenna array, means that to direct L beams to any desired angle or any desired combinations of angles, a beamforming transmitter or receiver may require multiple beams at each antenna array or at more than L antenna arrays. Compared to a transmitter, a receiver may have less freedom to choose beam directions for signals it receives.

An efficient antenna array configuration of phased antenna arrays and RF chains may, for example, reduce costs while providing sufficient beamforming performance, for example, beamwidth, gain, and ability to support any desired combinations of directions. Such configuration may support L-beam MIMO.

A bilateral L-beam (L≥2, with L being an integer) MIMO supporting at least P·L layers may be formed with P·L RF chains and 2L antenna arrays, where P∈{1,2}. Each of the RF chains forms may be associated with a single-polarization signal. Each of the antenna arrays may face a distinct direction, for example, a normal direction, defined as boresight with 0° phase shift, of each of the 2L antenna arrays may be distinct. For one class of beamforming devices that supports any combinations of L simultaneous beam directions across a 3-Dimensional (3D) sphere, antenna arrays may be placed in a polyhedron pattern with 2L sides, with FOVs of the antenna arrays (sides) facing outward from polyhedron. For one class of beamforming devices, resolvability of beam directions on a 2-Dimensional (2D) plane may be more important, and polyhedron pattern of antenna arrays for such class of beamforming devices may be reduced to a polygon pattern with 2L sides. For example, if azimuth-elevation orientation of such class of beamforming devices is stable, beam granularity in an elevation plane may be less important than that in an azimuthal plane. For transmission, output of an RF chain may map to only one antenna array. For reception, input to an RF chain may come from one selected antenna array or may be a combined signal from more than one antenna arrays.

Hereafter, for ease of illustration, simplified single-polarized examples of 2-Dimensional (2D) dual-beam MIMO scenarios, which support 2-layers (4-layers if cross-polarization), are described. A 2D plane of 2D examples may be denoted as an azimuthal plane. Furthermore, ideal scenarios are introduced, for example, a phased antenna array has 180° FOV, for example, ±90° from a normal direction, whereas maximum FOV in practice may be less than 180°, for example 120°. This could be due to impacts of array substrate, reflector, or other objects on electromagnetic wave fronts of wireless signals. Therefore, example embodiments introduced herein may be extended or modified, for example, a phased antenna array supporting more than 2L sides. In some embodiments, combined FOVs of any group of antenna arrays may be coupled to any given RF chains to form coverage of desired beam directions.

Figure 2:
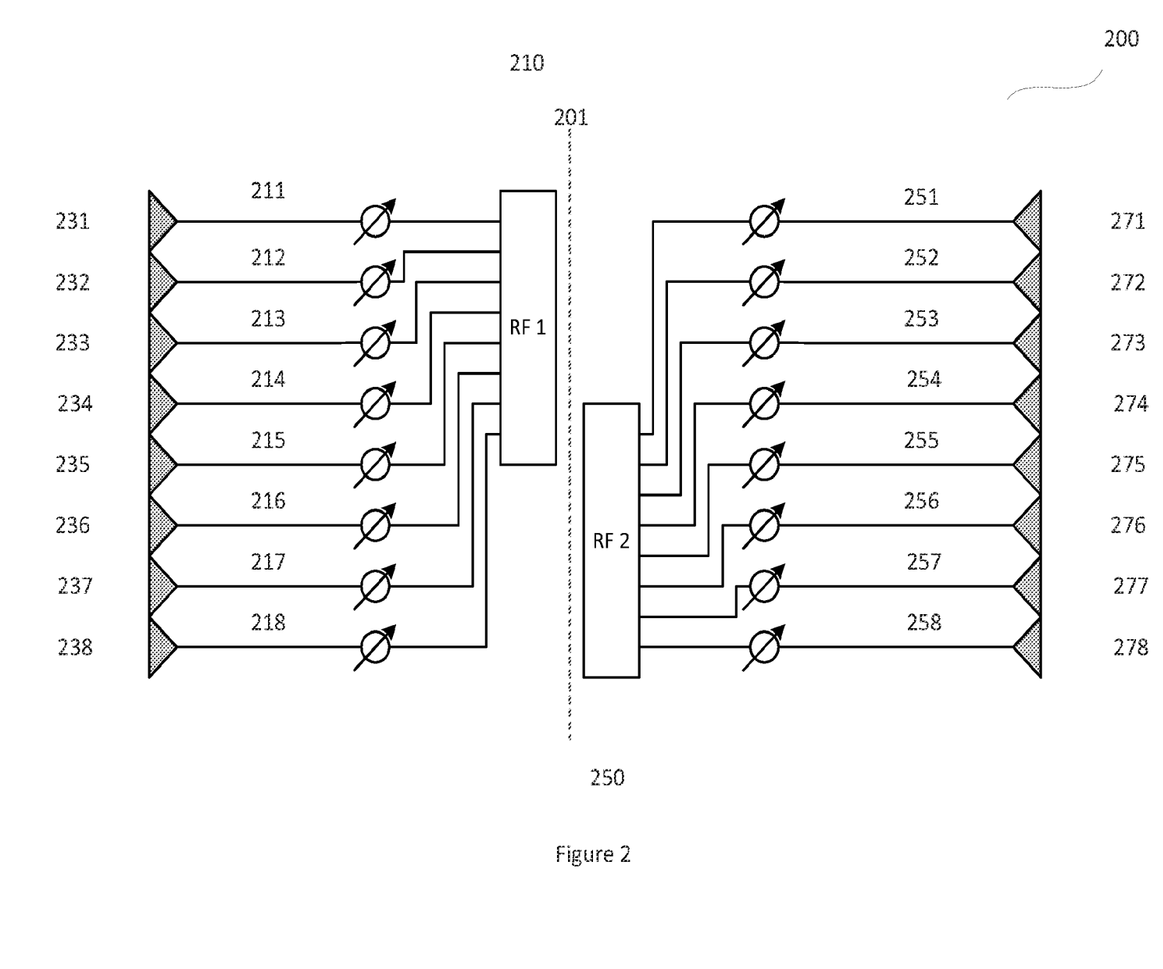
FIG. 2 shows a baseline single-beam-per-array configuration.

FIG. 2 shows a baseline phased antenna array configuration 200 for dual-beam MIMO SM reception. The baseline phased antenna array configuration 200 may be the simplest configuration for a dual-array with single-beam per array. The baseline phased antenna array configuration 200 may hereinafter also be referred to as a baseline configuration 200. In an ideal 2D scenario of 180° FOVs, the baseline configuration 200 may provide complete 360° coverage. The baseline configuration may employ RF chains 210 and 250. The baseline configuration 200 may also employ phase shifters 211-218 and antenna elements 231-238 connected to one RF chain 210, and phase shifters 251-258 and antenna elements 271-278 connected to the other RF chain 250. The phase shifters and antenna elements may form a plurality of antenna arrays with an FOV boundary 201. As described, there are 2 RF chains, 16 antenna elements, and 16 phase shifters in the example baseline configuration 200.

A 3-Dimensional (3D) extension of the baseline configuration 200 may be constructed by stacking additional rows of antenna elements in an elevation plane. This may provide not only azimuthal beam granularity but also elevation beam granularity, for example, 3D beamforming coverage. Such a 3D configuration may be taken as a baseline model, for example, in 5G industry for developing beamforming framework for UEs.

Figure 3:
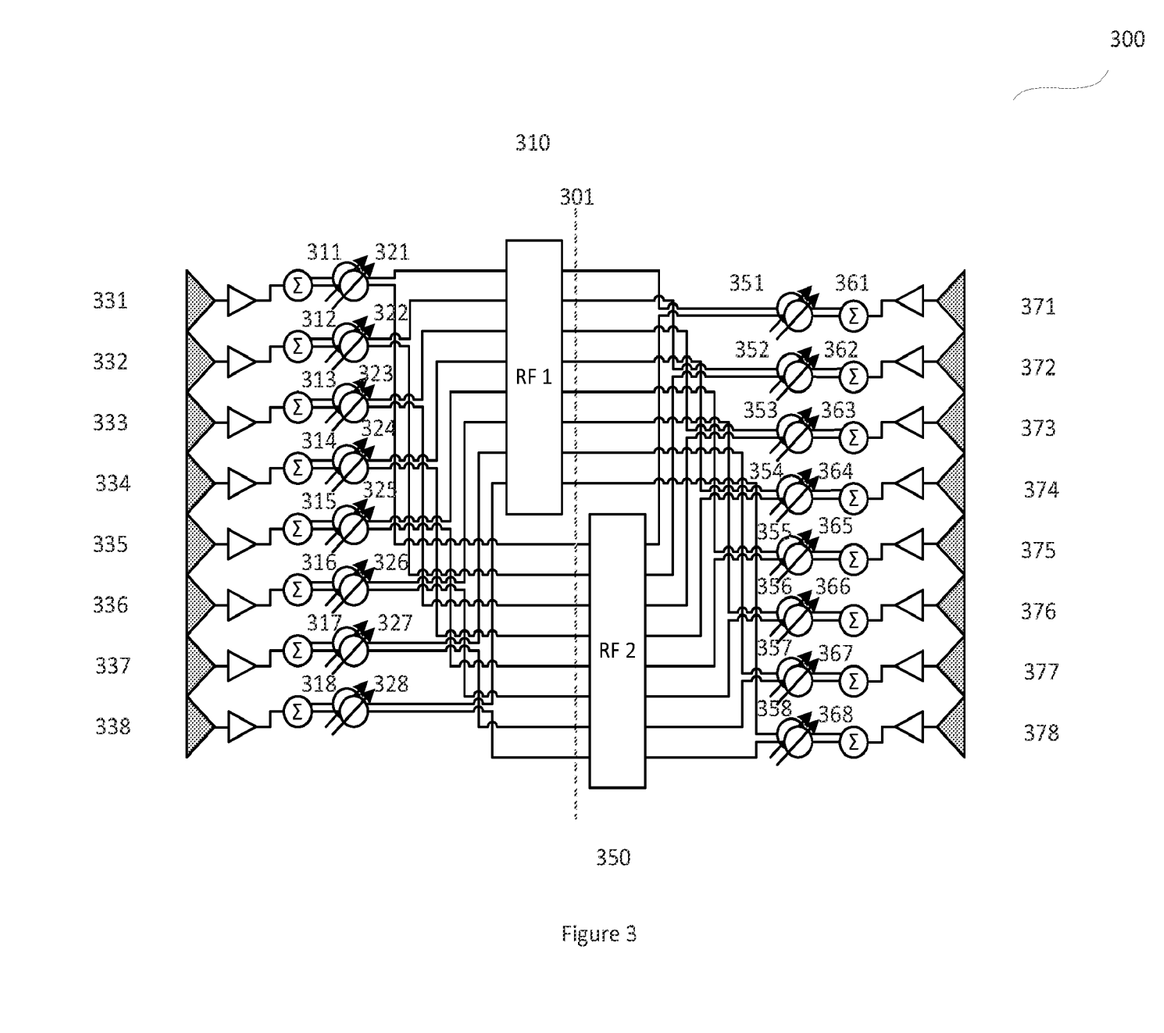
FIG. 3 shows a dual-beam-per-array configuration.

FIG. 3 shows a multi-beam-per-array configuration 300 for dual-beam MIMO SM reception. The multi-beam-per-array configuration 300, which may also be referred to as a mesh configuration 300, may employ RF chains, for example RF chains 310 and 350. The mesh configuration 300 may also employ phase shifters 311-318 and 321-328 and antenna elements 331-338 connected to one RF chain 310, and phase shifters 351-358 and 361-368 and antenna elements 371-378 connected to the other RF chain 350. The phase shifters and antenna elements form a plurality of antenna arrays with an FOV boundary 301. Compared to the baseline configuration 200 illustrated by FIG. 2, the mesh configuration 300 may utilize twice as many phase shifters and also additional hardware, for example, signal splitters, signal combiners, power amplifiers, and low noise power amplifiers. As described, there may be 2 RF chains, 16 antenna elements, 32 phase shifters, 16 signal splitters, 16 signal combiners, 16 power amplifiers, and 16 low noise amplifiers in the example mesh configuration 300. In addition, the mesh configuration 300 may include additional hardware to combat side-effects, for example, the mesh configuration 300 may utilize dedicated signal processing in RF chains and in baseband to handle intermodulation distortion of nonlinear active devices such as power amplifiers.

Figure 4A:
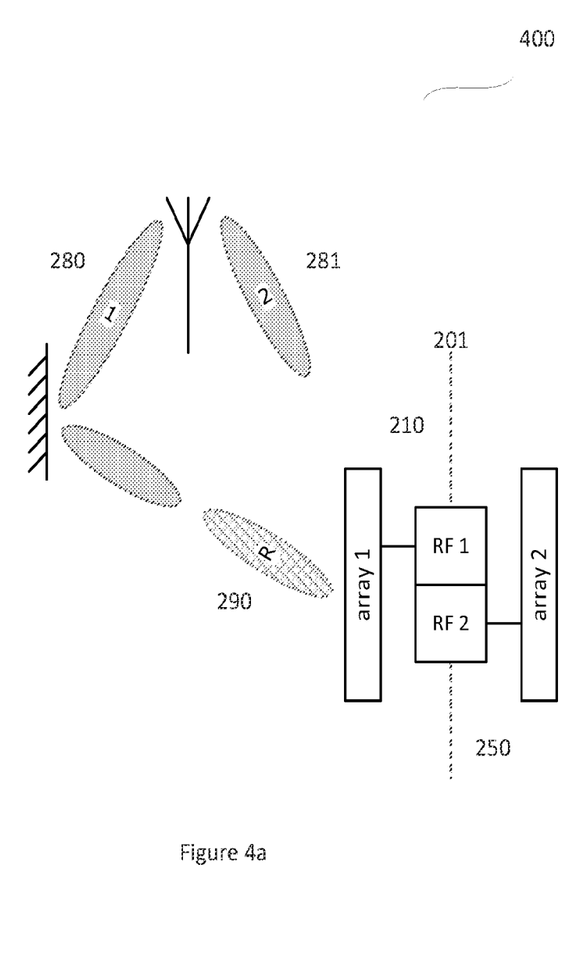
FIGS. 4a and 4b show reception of dual-layer Spatial Multiplexing (SM) signals with a baseline single-beam-per-array configuration and a dual-beam-per-array configuration.
Figure 4B:
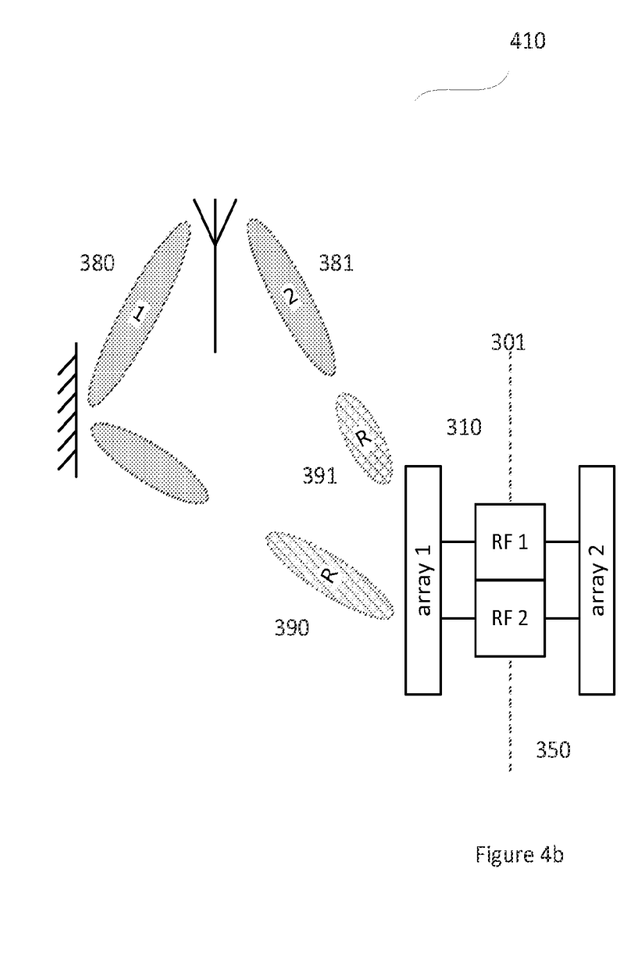

FIGS. 4a and 4b show a dual-layer MIMO SM scenario where two or more beamformed signals arrive at FOV of only one of the antenna arrays in accordance with some embodiments. FIG. 4a shows, for example, a dual-layer MIMO SM scenario 400 where two or more beamformed signals arrive at an FOV of only one of the antenna arrays of a baseline configuration 200. If, for example, two transmit signals carried by Tx beams 280 and 281 arrive at an FOV of one of the antenna arrays, for example, antenna array 1 coupled to RF chain 210, only one signal, for example the transmit signal carried by Tx beam 280 can be received via Rx beam 290. The baseline configuration may not support the intended full-rank (2-layer) 2-beam MIMO, and instead may need to fallback to 1-layer transmission with reduced throughput in such a scenario. FIG. 4b shows a mesh configuration, for example, a dual-layer MIMO SM scenario 410 where two or more beamformed signals arrive at an FOV of only one of the antenna arrays of a dual-beam-per-array mesh configuration 300. If, for example, two transmit signals carried by Tx beams 380 and 381 arrive at an FOV of one of the antenna arrays, for example, antenna array 1 coupled to RF chain 310 and RF chain 350, two signals, for example, the two transmit signals carried by Tx beams 380 and 381 can be received via Rx beams 390 and 391. Compared to the baseline configuration 200, the mesh configuration 300 may support such scenario, for example, two or more beamformed signals arrive at an FOV of only one of the antenna arrays.

As shown, the baseline configuration 200 illustrated by FIG. 2 may have a limitation in achieving maximum data throughput. It, for example, may not receive or resolve dual-layer SM signals carried by two Tx beams if both of them arrive at an FOV of one antenna array, for example, the antenna array coupled to RF chain 210, which may be in a blind zone of the other antenna array, for example, the antenna array coupled to RF chain 250. In general, the baseline configuration 200 may not receive multi-beam MIMO signals if signals carried by two or more Tx beams arrive at an FOV of only one antenna array. The mesh configuration 300 illustrated by FIG. 3 can form two main lobes per antenna array to receive and resolve dual-layer SM signals carried by two Tx beams arriving at any angle and, therefore, may achieve increased throughput. However, implementation effort and cost of use may be high.

Figure 5:
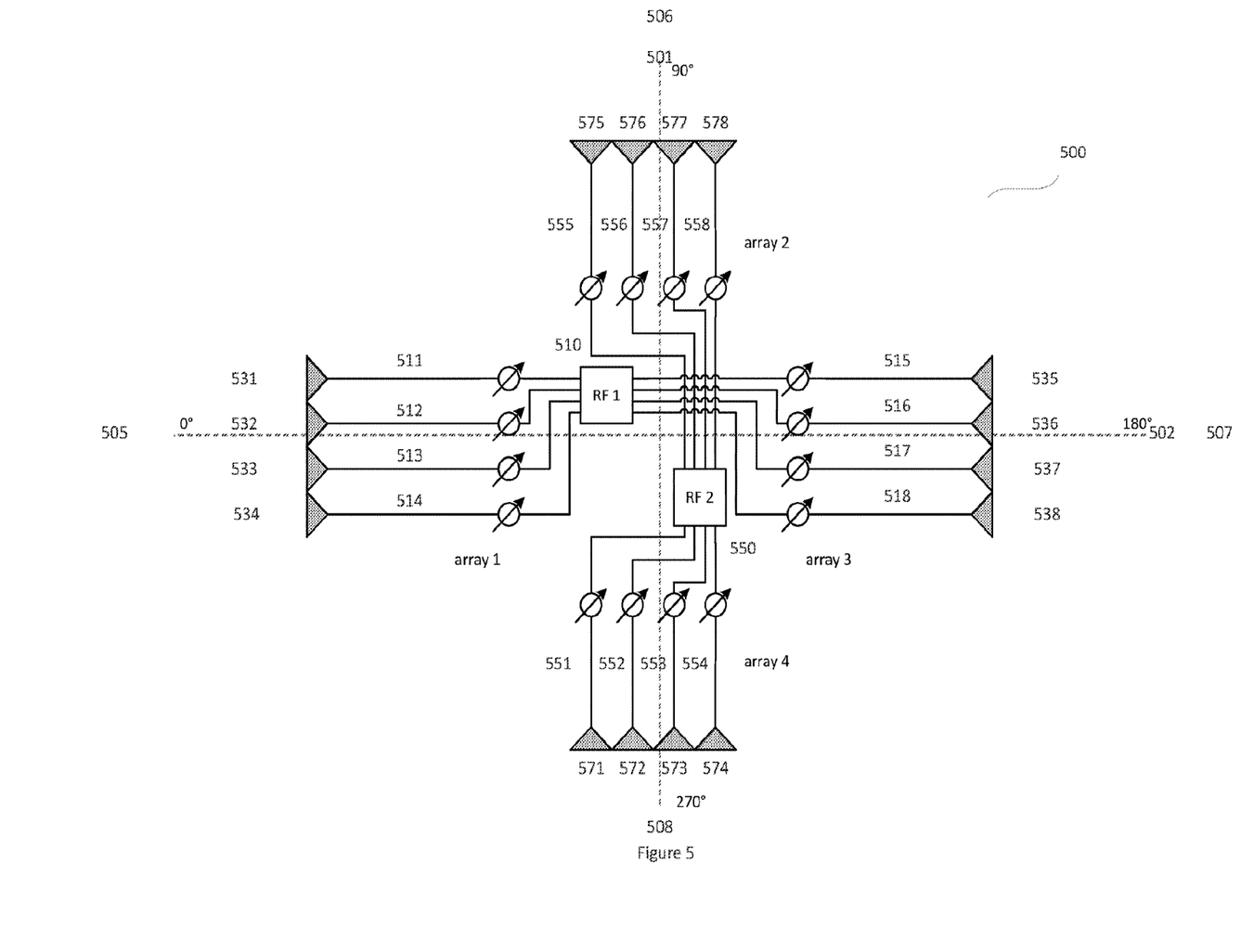
FIG. 5 shows a four-sided (rectangle) antenna array configuration in accordance with some embodiments.

In the following, a phased antenna array for high performance and high efficiency is described. FIG. 5 shows a single-polarized polyhedron antenna array configuration 500, for example a polygon antenna array configuration in 2D in accordance with some embodiments. The single-polarized polyhedron antenna array configuration 500, which may also be referred to as antenna array configuration 500, may employ a number of antenna elements and phase shifters that form a plurality of antenna arrays, for example, antenna arrays 505, 506, 507, and 508 with a vertical FOV boundary 501 and a horizontal FOV boundary 502. The antenna array configuration 500 may employ RF chains, for example, RF chains 510 and 550, coupled to the number of antenna elements and phase shifters, for example, coupled to a plurality of antenna arrays. The FOV boundary 501 and the FOV boundary 502 are, for example, perpendicular to each other. The FOV boundary 501 and the FOV boundary 502 may also be configured in other positions relative to each other. For example, the FOV boundary 501 can be positioned at any angle to the FOV boundary 502. Furthermore, the FOV boundary 501 and the FOV boundary 502 can be positioned at any angle with respect to a wireless communications device.

On a vertical level, one RF chain, for example, RF chain 510 may have a symmetric arrangement of phase shifters and antenna elements on both sides of the FOV boundary 501. For example, antenna array 505, which may include four phase shifters 511-514 and four antenna elements 531-534, may be connected to the RF chain 510, from a first side of the FOV boundary 501, and antenna array 507, which may include another four phase shifters 515-518 and another four antenna elements 535-538, may be connected to the RF chain 510 from a second side of the FOV boundary 501. The antenna arrays 505 and 507 may be considered symmetrical with one another as they are coupled with a common RF chain from opposing sides. On a horizontal level, the other RF chain, for example, RF chain 550, may have a symmetric arrangement of phase shifters and antenna elements on both sides of FOV boundary 502. For example, antenna array 508, which may include four phase shifters 551-554 and four antenna elements 571-574, may be connected to the RF chain 550 from a first side of the FOV boundary 502, and antenna array 506, which may include another four phase shifters 555-558 and another four antenna elements 575-578, may be connected to the RF chain 550 from a second side of the FOV boundary 502. The antenna array 506 may be symmetrical with antenna array 508. Asymmetric arrangements may be also made to construct four-sided antenna array configurations or other polygon array configurations.

In a 2D configuration, such as antenna array configuration 500, four (2L, L=2) single-beam antenna arrays may be formed, for example, with each RF chain being coupled to two antenna arrays. As shown, any pair of distinct Rx beams can be simultaneously supported by two antenna arrays that are associated with two RF chains, respectively. For example, on a vertical level, antenna array 505 may have a FOV with a range from 270° to 90° and antenna array 507 may have a FOV with a range from 90° to 270°. For example, on a horizontal level, the antenna array 506 may have a FOV with a range from 0° to 180°, and the antenna array 508 may have a FOV with a range from 180° to 0°. As described, a four-sided antenna array configuration, for example, a rectangle array configuration, is formed. Other polygon array configurations in 2D may be also formed. Furthermore, in various embodiments, a number of antenna elements and phase shifters form a plurality of antenna arrays. The number of antenna elements and phase shifters that form each of the plurality of antenna arrays, for example, antenna arrays 505, 506, 507, and 508, may be different.

A four-sided antenna array configuration may exhibit a number of principles. For a first example, for each polarization, a four-sided antenna array configuration may include more antenna arrays than RF chains. For a second example, an FOV of each antenna array may cover a distinct range of directions for transmission and reception of signals, and a distinct range of directions supported by each antenna array may partially overlap. For a third example, neighboring antenna arrays may be coupled to different RF chains. Furthermore, combined FOVs of all antenna arrays coupled to any given single RF chain may form complete coverage of desired beam directions, e.g., a complete 360°. Adhering to the principles, the example four-sided antenna array configuration may be extended to non-symmetric four-sided antenna array configurations or other polygon configurations with more antenna arrays (sides), for example hexagon (six-sided) configurations supporting 3 beams or octagon (eight-sided) configurations supporting 4 beams.

An example asymmetric four-sided antenna array configuration may include a plurality of antenna arrays with each of the antenna arrays including a different number of antenna elements and phase shifters. For example, a first antenna array may include three antenna elements and phase shifters, a second antenna array may include four antenna elements and phase shifters, a third antenna array may include five antenna elements and phase shifters, and a fourth antenna array may include six antenna elements and phase shifters.

Another example asymmetric four-sided antenna array configuration may include antenna arrays coupled with a common RF chain including a different number of antenna elements and phase shifters. For example, a first antenna array may include three antenna elements and phase shifters and a second antenna array, coupled to the same RF chain as the first antenna array, may include four antenna elements and phase shifters. In various embodiments, the first and second antenna arrays may include the same or different numbers of antenna elements and phase shifters as third and fourth antenna arrays. For example, with respect to the antenna array configuration 500, antenna array 505 may have a different number of antenna elements and phase shifters than antenna array 507, but may include the same (or a different) number of antenna elements and phase shifters as antenna array 506, or antenna array 508.

In some embodiments, an asymmetric four-sided antenna array configuration may include a plurality of antenna arrays with each of the plurality of antenna arrays having a normal direction that is distinct from normal directions of the other antenna arrays.

In some embodiments, an asymmetric four-sided antenna array configuration may include a plurality of antenna arrays with each of the antenna arrays having a different FOV.

In some embodiments, a hexagon (six-sided) antenna array configuration can support 3 beams. A hexagon configuration can be symmetric or asymmetric.

In some embodiments, an octagon (eight-sided) antenna array configuration can support 4 beams. An octagon configuration can be symmetric or asymmetric.

In various embodiments, 3D polyhedron antenna array configurations may be constructed. Normal directions of member antenna arrays of a 3D polyhedron antenna array configuration may address all three axes of 3D space. For example, for a 3-beam MIMO, six antenna arrays coupled to three RF chains may form a hexahedron. This may reduce to a cube in a symmetric subcase. In general, a 2L-sided polyhedron antenna array configuration can be constructed for L-beam MIMO with P·L RF chains and 2L antenna arrays.

Such a four-sided antenna array configuration may support any simultaneous pair of distinct Rx beam directions compared to the baseline configuration illustrated by FIG. 2. Moreover, for such a four-sided antenna array configuration, no additional hardware components, for example phase shifters, signal splitters, signal combiners, power amplifiers, or low noise amplifiers are required compared to the mesh configuration illustrated by FIG. 3.

Figure 6:
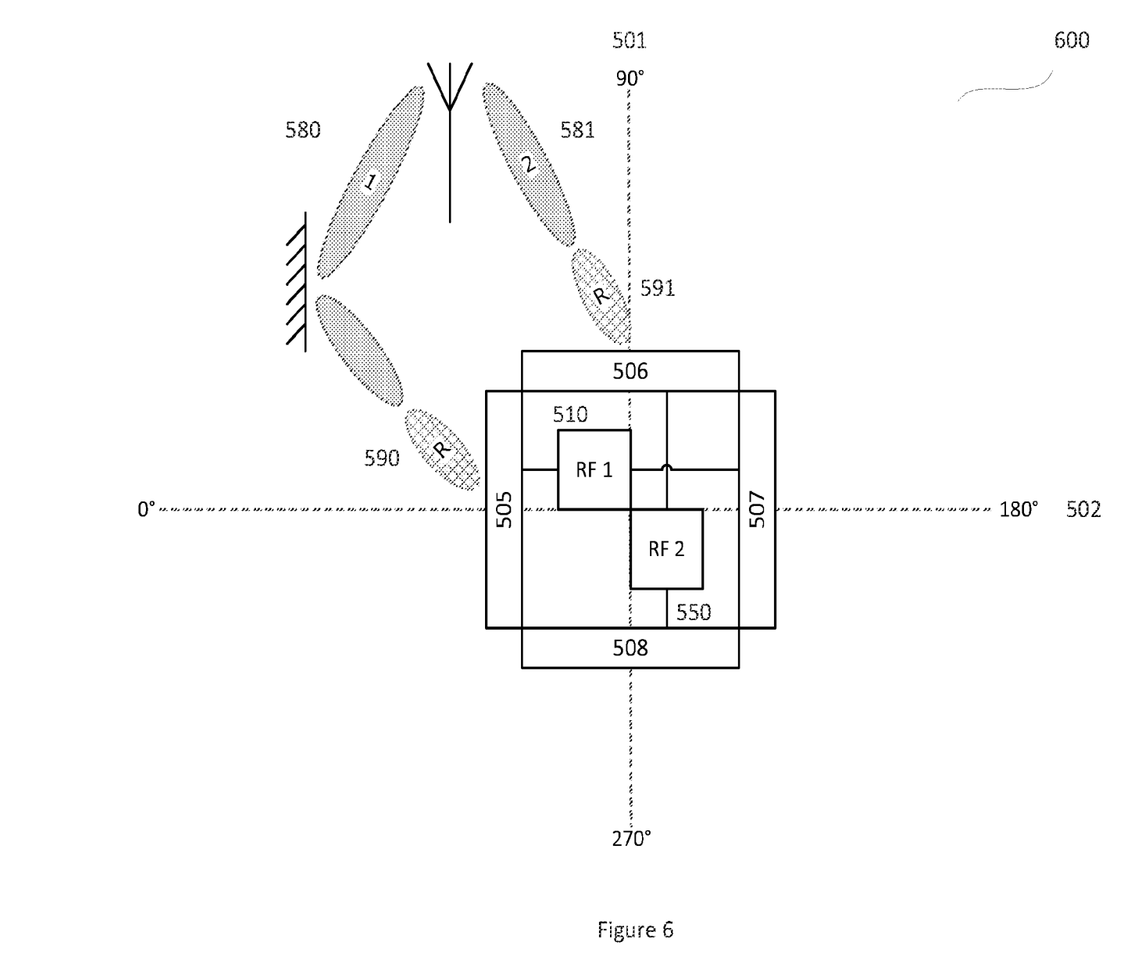
FIG. 6 shows reception of dual-layer Spatial Multiplexing (SM) signals with a four-sided (rectangle) antenna array configuration in accordance with some embodiments.

FIG. 6 shows reception of spatially multiplexed dual-layer signals with a four-sided (rectangle) antenna array configuration 600 in accordance with some embodiments. If, for example, two transmit signals carried by two Tx beams, for example, Tx beams 580 and 581, arrive at FOV of any one of the antenna arrays 505-508 coupled to RF chains 510 and 550, they can be received via two Rx beams, for example, Rx beams 590 and 591. Compared to the baseline configuration 200 or the mesh configuration 300 illustrated by FIGS. 2 and 3, respectively, the four-sided antenna array configuration can support the scenarios where two or more beamformed signals arrive at FOV of any one of the antenna arrays. This is because neighboring antenna arrays have overlapping FOVs and are coupled to different RF chains.

For example, two transmit signals carried by Tx beams 580 and 581 may arrive at different angles to FOV boundary 502. One transmit signal carried by Tx beam 580, for example, may arrive at an angle of 45° to FOV boundary 502, and the other transmit signal carried by Tx beam 581, for example, may arrive at an angle of 60° to FOV boundary 502. In this scenario, one transmit signal can be received via Rx beam 590 by antenna array 505 coupled to RF chain 510, and the other transmit signal can be received via Rx beam 591 by antenna array 506 coupled to RF chain 550.

For example, two transmit signals carried by Tx beams 580 and 581 may arrive at different angles to FOV boundary 502. One transmit signal carried by Tx beam 580, for example, may arrive at an angle of 30° to FOV boundary 502, and the other transmit signal carried by Tx beam 581, for example, may arrive at an angle of 210° to FOV boundary 502. In this scenario, one transmit signal can be received via Rx beam 590 by antenna array 505 coupled to RF chain 510, and the other transmit signal can be received via Rx beam 591 by antenna array 508 coupled to RF chain 550. Or, one transmit signal can be received via Rx beam 590 by antenna array 506 coupled to RF chain 550, and the other transmit signal can be received via Rx beam 591 by antenna array 507 coupled to RF chain 510. Other reception arrangements can also be made.

As such, the four-sided antenna array configuration can receive and resolve two or more beamformed signals arriving at any angles. Such configuration may achieve an increased throughput of multi-beam MIMO.

The class of polyhedron antenna array configurations, including an example four-sided antenna array configuration illustrated by FIG. 5, may be used for efficient transmission of multi-beam MIMO signals in addition to reception as shown in above examples. Moreover, the configurations allow directing two or more transmit beams, each carrying a distinct signal from an RF chain, in any combinations of angles. In contrast, a baseline configuration cannot direct its Tx beams to any combinations of angles. A mesh configuration can direct its Tx beams to any combinations of angles, however, at a cost of signal combiners, power amplifiers, and extra phase shifters.

Components of the wireless communications device, for example, transmitter, receiver, phase shifters, antenna elements, signal splitters, signal combiners, power amplifiers, low noise amplifiers may for example be implemented by one or more circuits. A "circuit" may be understood as any kind of a logic implementing entity, which may be special purpose circuitry or processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 7:
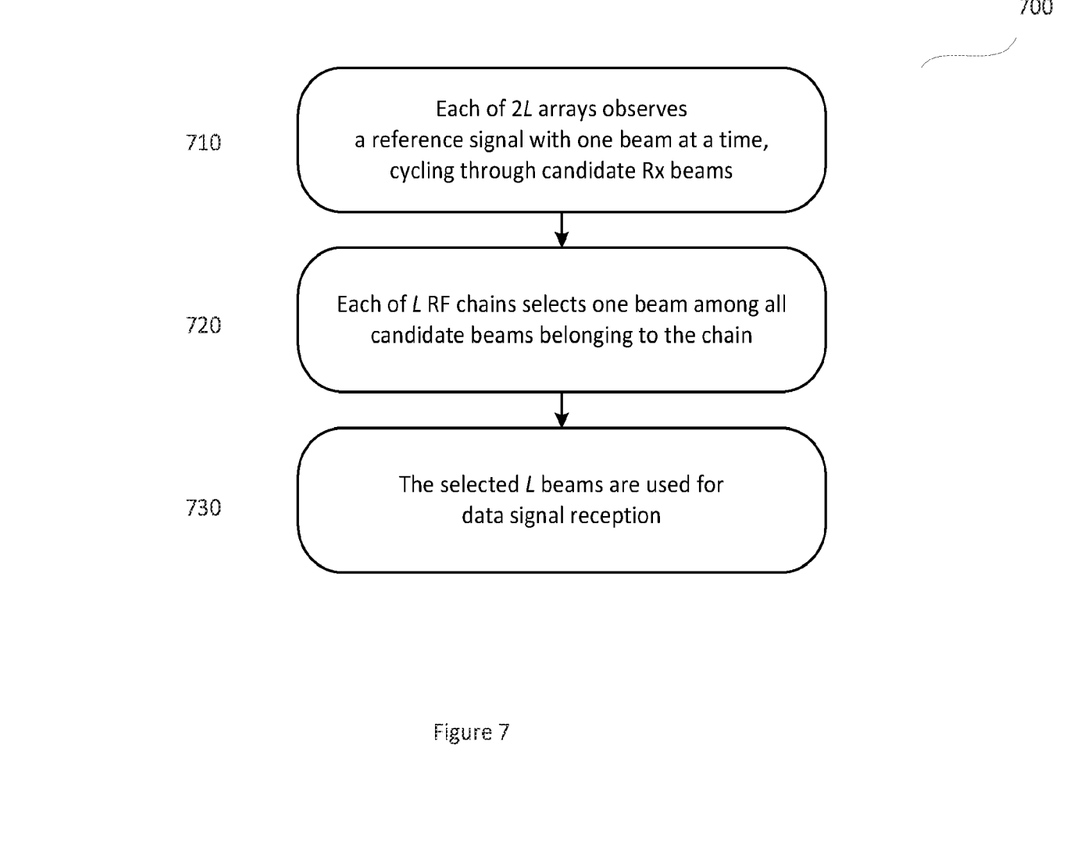
FIG. 7 shows a flow diagram illustrating an example method for selecting and receiving a beamformed signal in accordance with some embodiments.

A wireless communications device is embedded with, for example, a 2L-sided polyhedron antenna array configuration with L RF chains which support L-Layer multi-beam MIMO. The 2L-sided polyhedron antenna array configuration, for example when L=2, can be a 4-sided array configuration illustrated by FIG. 5 which carries out an example method for receiving or transmitting beamformed signals as illustrated by FIG. 7. As described, the wireless communications device can be a UE, a mobile device, a receiver, a transmitter, or a MS.

FIG. 7 shows a flow diagram 700 that illustrates a flow diagram depicting an example method for selecting Rx beams and receiving beamformed signals in accordance with some embodiments.

In 710, a wireless communications device embedded with a polyhedron antenna array configuration, for example a four-sided antenna array configuration illustrated by FIG. 5, receives, for example, a reference signal. The wireless communications device may receive a reference signal from base stations, for example base station 120 illustrated by FIG. 1. A reference signal, also known as a pilot, denotes a group of distinct time-frequency resources occupied by pre-determined signals of known pattern. There may be one or more reference signals. The wireless communications device makes multiple independent observations of the reference signal with an Rx beam among an associated number of candidate Rx beam directions supported by each antenna array. For example, during each independent observation, it observes the reference signal using one candidate Rx beam supported by each antenna array at a time. With such independent observations, each antenna array cycles through candidate Rx beams it supports. Moreover, multiple independent observations can be made at each antenna array in parallel.

In 720, the wireless communications device embedded with a four-sided antenna array configuration illustrated by FIG. 5 has for example a selection criterion. There may be one or more selection criteria. For each RF chain, for example RF chain 510 or 550, the wireless communications device selects at most one Rx beam out of the associated number of candidate Rx beam directions supported by each antenna array according to the selection criterion. Moreover, one Rx beam out of each antenna array can be selected in parallel. The selected Rx beam represents for example high signal strength, high Signal-to-Noise Ratio (SNR). As described, the selected Rx beam contributes to good signal reception or transmission.

In 730, the selected L Rx beams are used for signal reception until a next beam training cycle starts, i.e. each antenna array observing a reference signal with each candidate Rx beam among an associated number of candidate Rx beam directions supported by each antenna array, each RF chain selecting one Rx beam out of the candidate Rx beams among the associated number of candidate Rx beam directions according to the selection criterion. In 730, the selected Rx beams, for example in 720 are used at the antenna arrays to capture target signals. The target signals are amplified and down converted to baseband, digitized at a bank of ADC, and MIMO decoded (demultiplexed) to reproduce transmitted data.

For signal transmission, it follows a similar beam training cycle process. If there is Tx-Rx channel reciprocity, a transmit beam may be the same as a selected receive beam. Moreover, a L-beam MIMO signal transmission with a polyhedron antenna array configuration may for example include modulating L individually identifiable reference signals, sending each reference signal to one RF chain, transmitting each reference signal by using one Tx beam at one antenna array coupled to the associated RF chain. The L reference signals may be simultaneously transmitted. Tx beams may be cycled for each RF chain. Based on Tx-beam-cycled reference signals, base stations, for example base station 120 illustrated by FIG. 1, may feedback identifiers on which Tx beam for each RF chain works the best. A UE then transmit data signals using the identified set of Tx beams.

The following examples pertain to further embodiments.

Example 1 is a Multiple-Input-Multiple-Output (MIMO) antenna array configuration illustrated by FIG. 5.

In Example 2, the subject matter of Example 1 may optionally include each neighboring antenna array of the plurality of antenna arrays being coupled to a different RF chain of the plurality of RF chains.

In Example 3, the subject matter of any of Examples 1-2 may optionally include each antenna array of the plurality of antenna arrays covering a distinct range of directions for transmission and reception of signals, and distinct ranges of directions supported by the plurality of antenna arrays partially overlapping.

In Example 4, the subject matter of any one of Examples 1-3 may optionally include a same number of the plurality of antenna elements and phase shifters forming each of the plurality of antenna arrays.

In Example 5, the subject matter of any one of Examples 1-3 may optionally include a different number of the plurality of antenna elements and phase shifters forming each of the plurality of antenna arrays.

In Example 6, the subject matter of any one of Examples 1-3 may optionally include a number of the plurality of antenna elements and phase shifters that form a first antenna array being the same as a number of the plurality of antenna elements and phase shifters that form a second antenna array that is symmetric with the first antenna array.

In Example 7, the subject matter of any one of Examples 1-3 may optionally include a number of the plurality of antenna elements and phase shifters that form a first antenna array being different from a number of the plurality of antenna elements and phase shifters that form a second antenna array that is symmetric with the first antenna array.

In Example 8, the subject matter of any one of Examples 1-3 may optionally include a number of the plurality of antenna elements and phase shifters that form a first antenna array being the same as a number of the plurality of antenna elements and phase shifters that form a second antenna array that is asymmetric with the first antenna array.

In Example 9, the subject matter of any one of Examples 1-3 may optionally include a number of the plurality of antenna elements and phase shifters that form a firstantenna array being different than a number of the plurality of antenna elements and phase shifters that form a second antenna array that is asymmetric with the first antenna array.

In Example 10, the subject matter of any one of Examples 1-9 may optionally include the MIMO antenna array configuration supporting full-rank MIMO.

Example 11 is a wireless communications device. The wireless communications device may optionally include a plurality of antenna arrays configured for a Multiple-Input-Multiple-Output (MIMO) antenna array configuration, a receiver coupled to the MIMO antenna array configuration to receive signals, and a transmitter coupled to the MIMO antenna array configuration to transmit signals. The MIMO antenna array configuration may optionally include a plurality of Radio Frequency (RF) chains coupled to the plurality of antenna arrays, and the number of antenna arrays may be optionally larger than the number of RF chains.

In Example 12, the subject matter of Example 11 may optionally include neighboring antenna array of the plurality of antenna arrays being coupled to a different RF chain of the plurality of RF chains.

In Example 13, the subject matter of any one of Examples 11-12 may optionally include each antenna array of the plurality of antenna arrays covering a distinct range of directions for transmission and reception of signals, and distinct ranges of directions supported by the plurality of antenna arrays partially overlapping.

In Example 14, the subject matter of any one of Examples 11-13 may optionally include the receiver receiving the signals carried by receive beams via the MIMO antenna array configuration.

In Example 15, the subject matter of any one of Examples 11-14 may optionally include the transmitter transmitting the signals carried by transmit beams via the MIMO antenna array configuration.

In Example 16, the subject matter of any one of Examples 11-15 may optionally include each of the plurality of antenna arrays comprising a same number of antenna elements and phase shifters.

In Example 17, the subject matter of any one of Examples 11-15 may optionally include each of the plurality of antenna arrays comprising a different number of antenna elements and phase shifters.

In Example 18, the subject matter of any one of Examples 11-15 may optionally include individual antenna arrays of the plurality of antenna arrays comprising a plurality of antenna elements and phase shifters, and a number of the plurality of antenna elements and phase shifters for a first antenna array of the plurality of antenna arrays being the same as a number of the plurality of antenna elements and phase shifters for a second antenna array of the plurality of antenna arrays that is symmetric with the first antenna array.

In Example 19, the subject matter of any one of Examples 11-15 may optionally include individual antenna arrays of the plurality of antenna arrays comprising a plurality of antenna elements and phase shifters, and a number of the plurality of antenna elements and phase shifters for a first antenna array of the plurality of antenna arrays being different from a number of the plurality of antenna elements and phase shifters for a second antenna array of the plurality of antenna arrays that is symmetric with the first antenna array.

In Example 20, the subject matter of any one of Examples 11-15 may optionally include individual antenna arrays of the plurality of antenna arrays comprising a plurality of antenna elements and phase shifters, and a number of the plurality of antenna elements and phase shifters for a first antenna array of the plurality of antenna arrays being the same as a number of the plurality of antenna elements and phase shifters for a second antenna array of the plurality of antenna arrays that is asymmetric with the first antenna array.

In Example 21, the subject matter of any one of Examples 11-15 may optionally include individual antenna arrays of the plurality of antenna arrays comprising a plurality of antenna elements and phase shifters, and a number of the plurality of antenna elements and phase shifters for a first antenna array of the plurality of antenna arrays being different from a number of the plurality of antenna elements and phase shifters for a second antenna array of the plurality of antenna array that is asymmetric with the first antenna array.

Example 22 is a method for receiving multiple beamformed signals illustrated by FIG. 7.

In Example 23, the subject matter of Example 22 may optionally include the candidate receive beams being among an associated number of candidate receive beam directions of each of the plurality of antenna arrays.

In Example 24, the subject matter of any one of Examples 22-23 may optionally include the multiple independent observations being made at each of the plurality of antenna arrays in parallel.

In Example 25, the subject matter of any one of Examples 22-24 may optionally include the receive beam out of each of the plurality of antenna arrays being selected in parallel.

In Example 26, the subject matter of any one of Examples 22-25 may optionally include the selected receive beam representing high signal strength.

In Example 27, the subject matter of any one of Examples 22-26 may optionally include the selected receive beam representing high Signal-to-Noise Ratio (SNR).

In Example 28, the subject matter of any one of Examples 22-27 may optionally include the selected receive beam at each of the plurality of antenna arrays being used for signal reception until a next beam training cycle starts.

In Example 29, the subject matter of any one of Examples 22-28 may optionally include the selected receive beam at each of the plurality of antenna arrays being used to capture a target signal.

In Example 30, the subject matter of Example 29 may optionally include the target signal being amplified and down converted for baseband processing to reproduce transmitted data.

In Example 31, the subject matter of any one of Examples 22-30 may optionally include the reference signal being a group of distinct time-frequency resources occupied by pre-determined signals of known pattern.

In Example 32, the subject matter of any one of Examples 22-31 may optionally include the selection criterion being one of a group of selection criteria.

Example 33 is a computer readable medium having recorded instructions thereon which, when executed by a processor, make the processor perform a method for receiving multiple beamformed signals according to any one of Examples 22 to 32.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

The term "computer-readable media" includes computer-storage media. In one embodiment, computer-readable media is non-transitory. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

The invention claimed is:

1. A user equipment (UE), comprising:
a plurality of antenna arrays configured to form respective receive (RX) beams for receiving one or more reference signals; and
an radio frequency (RF) chain coupled with at least two antenna arrays of the plurality of antenna arrays and configured to:
receive at least two RX beam-formed reference signals with respect to respective antenna arrays of said at least two antenna arrays, using a plurality of candidate RX beams, for respective reference signal measurements; and
perform signal reception, via a determined beam of the plurality of the candidate RX beams for each of the at least two antenna arrays, based on the respective reference signal measurements;
baseband circuitry coupled to the RF chain, wherein the baseband circuitry is configured to perform operations comprising:
via each antenna array of the at least two antenna arrays, measuring the respective RX beam-formed reference signal using the plurality of candidate RX beams, to obtain the respective reference signal measurements for the antenna array, wherein each of the plurality of candidate RX beams corresponds to a different beam direction; and
selecting said determined beam for each antenna array of the at least two antenna arrays based on the respective reference signal measurements for the antenna array.

2. The user equipment of claim 1, wherein the operations also comprise:
configuring said least two antenna arrays to perform beamforming using the respective determined beams.

3. The user equipment of claim 1, wherein the operations also comprise:

receiving, via the RF chain, (a) a first output signal from a first of the at least two antenna arrays and (b) a second output signal from a second of the at least two antenna arrays, wherein reception of (a) and reception of (b) at least partially overlap in time, wherein the first output signal has been beamformed at the first antenna array based on the determined beam of the first antenna array, wherein the second output signal has been beamformed at the second antenna array based on the determined beam of the second antenna array.

4. The user equipment of claim 1, further comprising an additional RF chain coupled to at least two additional antenna arrays of the plurality of antenna arrays, wherein the operations also comprise:
via the RF chain, receiving a first output signal from a first antenna array of the at least two antenna arrays, wherein the first output signal has been beamformed at the first antenna array based on the determined beam of the first antenna array; and
via the additional RF, receiving a second output signal from a second antenna array of the at least two additional antenna arrays, wherein the second output signal has been beamformed at the second antenna array based on the determined beam of the second antenna array.

5. The user equipment of claim 4, wherein said receiving via the first RF chain and said receiving via the additional RF chain are performed simultaneously.

6. The user equipment of claim 1, wherein the operations also comprise:
transmitting, via the RF chain, (a) a first transmit signal from a first of the at least two antenna arrays and (b) a second transmit signal from a second of the at least two antenna arrays, wherein the first transmit signal is beamformed at the first antenna array based on the determined beam of the first antenna array, wherein the second transmit signal is beamformed at the second antenna array based on the determined beam of the second antenna array.

7. The user equipment of claim 1, further comprising an additional RF chain coupled to at least two additional antenna arrays of the plurality of antenna arrays, wherein the operations also comprise:
via the RF chain, transmitting a first transmit signal from a first antenna array of the at least two antenna arrays, wherein the first transmit signal is beamformed at the first antenna array based on the determined beam of the first antenna array; and
via the additional RF chain, transmitting a second transmit signal from a second antenna array of the at least two additional antenna arrays, wherein the second transmit signal is beamformed at the second antenna array based on the determined beam of the second antenna array.

8. The user equipment of claim 1, wherein the RF chain is coupled to a first and second of the antenna arrays, wherein the first and second antenna arrays are symmetric with respect to a field of view boundary.

9. The user equipment of claim 1, further comprising a plurality of RF chains includes said RF chain, wherein neighboring antenna arrays of said plurality of antenna arrays are coupled to different ones of said plurality of RF chains.

10. The user equipment of claim 1, wherein each of the antenna arrays of said plurality of antenna arrays covers a corresponding range of directions for transmission and/or reception of signals, wherein the ranges of neighboring antenna arrays of said plurality of antenna arrays partially overlap.

11. The user equipment of claim 1, wherein each of the antenna arrays of the at least two antenna arrays includes a corresponding plurality of phase shifters and a corresponding plurality of antenna elements.

12. The user equipment of claim 11,
wherein the baseband circuitry is configured to control the phase shifters of a first of the at least two antenna arrays, to form the determined beam of the first antenna array.

13. The user equipment of claim 11, wherein the baseband circuitry is further configured to (a) control the phase shifters of a first of the at least two antenna arrays to form the determined beam of the first antenna array and (b) control the phase shifters of a second of the at least two antenna arrays to form the determined beam of the second antenna array, wherein the first antenna array and the second antenna array neighbor each other, wherein (a) and (b) at least partially overlap in time.

14. A method for operating a communication device, the method comprising:
via each antenna array of a plurality of antenna arrays, making observations of a reference signal through candidate receive beams of the antenna array; and
for each antenna array of the plurality of antenna arrays, select a corresponding receive beam from the candidate receive beams of the antenna array;
performing beamforming at the plurality of antenna arrays to obtain a respective plurality of beamformed signals, wherein beamforming is separately applied at each of the antenna arrays, wherein the beamforming performed at each antenna array is based on the corresponding selected receive beam;
receiving the plurality of beamformed signals at a radio frequency (RF) chain, wherein said receiving includes receiving (a) a first output signal from a first of the antenna arrays and (b) a second output signal from a second of the antenna arrays, wherein said receiving of (a) and said receiving of (b) partially overlap in time, wherein the first output signal is beamformed at the first antenna array based on the selected receive beam of the first antenna array, wherein the second output signal is beamformed at the second antenna array based on the selected receive beam of the second antenna array.

15. The method of claim 14, wherein the plurality of beamformed signals are received at the RF chain, wherein the observations corresponding to the plurality of antenna arrays are made in at least partially in parallel.

16. The method of claim 14, wherein the plurality of antenna arrays share a common state of polarization.

17. The method of claim 14, wherein the reference signal includes a plurality of predetermined signals occurring at time-frequency resource locations of known pattern.

18. A user equipment comprising:
a plurality of antenna arrays, wherein each of the antenna arrays includes a corresponding plurality of phase shifters and a corresponding plurality of antenna elements;
a radio frequency front end (RFFE) coupled to the plurality of antenna arrays; and
one or more baseband processors coupled to the RFFE, wherein the one or more baseband processors are configured to perform operations comprising:
with respect to each antenna array in the plurality of antenna arrays, measuring a reference signal using a corresponding plurality of candidate beam directions, to obtain a corresponding plurality of measurements, and selecting a candidate beam direction from among the plurality of candidate beam directions based on the corresponding plurality of measurements;
wherein the RFFE includes a first radio frequency (RF) chain, wherein the operations also comprise:
receiving, via the first RF chain, (a) a first output signal from a first of the antenna arrays and (b) a second output signal from a second of the antenna arrays, wherein said receiving of (a) and said receiving of (b) partially overlap in time, wherein the first output signal has been beamformed at the first antenna array based on the selected candidate beam direction of the first antenna array, wherein the second output signal has been beamformed at the second antenna array based on the selected candidate beam direction of the second antenna array.

19. The user equipment of claim 18, wherein the antenna arrays of said plurality of antenna arrays share a common state of polarization.

20. The user equipment of claim 18, wherein the RFFE also includes a second RF chain coupled to a third and fourth of the antenna arrays of said plurality of antenna arrays.

* * * * *